United States Patent
Yokel et al.

(10) Patent No.: US 9,259,670 B2
(45) Date of Patent: Feb. 16, 2016

(54) FLOW-THROUGH FILTER TO REMOVE ALUMINUM FROM MEDICAL SOLUTIONS

(71) Applicants: The University of Kentucky Research Foundation, Lexington, KY (US); The Curators of the University of Missouri, Columbia, MO (US)

(72) Inventors: Robert A. Yokel, Lexington, KY (US); Wesley R. Harris, St. Louis, MO (US); Christopher D. Spilling, St. Louis, MO (US); Robert Joseph Kuhn, Nicholasville, KY (US); Vasiliy Paul Abramov, Louisville, KY (US); Jason Matthew Lone, Louisville, KY (US)

(73) Assignees: The University of Kentucky Research Foundation, Lexington, KY (US); The Curators of the University of Missouri, Columbia, MO (US); Alkymos, Inc., Lexington, KY (US)

( * ) Notice: Subject to any disclaimer, the term of this patent is extended or adjusted under 35 U.S.C. 154(b) by 169 days.

(21) Appl. No.: 14/186,207

(22) Filed: Feb. 21, 2014

(65) Prior Publication Data
US 2014/0231321 A1    Aug. 21, 2014

Related U.S. Application Data (60) Continuation-in-part of application No. 13/278,498, filed on Oct. 21, 2011, now Pat. No. 9,139,456, which is a continuation-in-part of application No. 13/052,477, filed on Mar. 21, 2011, now Pat. No. 8,066,883, which is a division of application No. 12/104,066, filed on Apr. 16, 2008, now Pat. No. 7,932,326.

(60) Provisional application No. 61/768,006, filed on Feb. 22, 2013.

(51) Int. Cl.
| | |
|---|---|
| B01D 15/38 | (2006.01) |
| B01J 45/00 | (2006.01) |
| B01J 20/32 | (2006.01) |
| C02F 1/68 | (2006.01) |
| C02F 101/20 | (2006.01) |

(52) U.S. Cl.
CPC ......... B01D 15/3828 (2013.01); B01J 20/3251 (2013.01); B01J 20/3253 (2013.01); B01J 20/3255 (2013.01); B01J 45/00 (2013.01); C02F 1/683 (2013.01); *C02F 2101/20* (2013.01)

(58) Field of Classification Search
None
See application file for complete search history.

(56) References Cited

U.S. PATENT DOCUMENTS

| | | | |
|---|---|---|---|
| 4,599,361 | A | 7/1986 | Dickens et al. |
| 4,654,299 | A | 3/1987 | Lentfer |

(Continued)

FOREIGN PATENT DOCUMENTS

| | | |
|---|---|---|
| CN | 1413773 A | 4/2003 |
| WO | 9300327 A1 | 1/1993 |

OTHER PUBLICATIONS

Chen & Zhan; "Computational Modeling of Aluminum (III)—Ligand Binding"; Progress Report, University of Kentucky, Jan. 18, 2006; pp. 1-3.

(Continued)

*Primary Examiner* — Chester Barry
(74) *Attorney, Agent, or Firm* — King & Schickli, PLLC (57) ABSTRACT

A flow through filter assembly includes a trivalent and tetravalent metal ion capturing agent and a flow controller providing a predetermined flow rate which allows capture of the trivalent and tetravalent metal ions by the capturing agent.

20 Claims, 4 Drawing Sheets

(56) References Cited

U.S. PATENT DOCUMENTS

| | | | |
|---|---|---|---|
| 4,666,927 | A | 5/1987 | Hider et al. |
| 4,671,901 | A | 6/1987 | Green |
| 4,684,482 | A | 8/1987 | Green |
| 5,089,644 | A | 2/1992 | Quay et al. |
| 5,104,865 | A | 4/1992 | Hider et al. |
| 5,254,724 | A | 10/1993 | Bergeron, Jr. |
| 5,312,730 | A | 5/1994 | Piran et al. |
| 5,332,649 | A | 7/1994 | Bleckmann et al. |
| 5,424,219 | A | 6/1995 | Jirikowski |
| 5,663,201 | A | 9/1997 | Lowther et al. |
| 5,728,681 | A | 3/1998 | Kido et al. |
| 5,739,167 | A | 4/1998 | Lowther et al. |
| 5,756,825 | A | 5/1998 | Safavy et al. |
| 6,022,865 | A | 2/2000 | Deutsch |
| 6,071,412 | A | 6/2000 | Ambrus et al. |
| 6,132,750 | A | 10/2000 | Perrier et al. |
| 6,391,980 | B1 | 5/2002 | Clark |
| 6,693,173 | B2 | 2/2004 | Mamidi et al. |
| 6,858,414 | B2 | 2/2005 | Keri et al. |
| 7,932,326 | B2 | 4/2011 | Yokel et al. |
| 8,066,883 | B2 | 11/2011 | Yokel et al. |
| 2005/0276862 | A1 | 12/2005 | Bringley et al. |
| 2005/0277752 | A1 | 12/2005 | Bringley |
| 2006/0211773 | A1 | 9/2006 | Bergeron et al. |

OTHER PUBLICATIONS

Crumbliss, et al.; "Synthesis and Characterization of Iron(III) Chelating Analogues of Siderophores on Organic Solid Supports"; Inorganica Chemica Acta, 133 (1987), pp. 281-287.

Dr. Yokel; "Reduction of Toxicity in the Premature Neonate Associated with Aluminum as a Contaminant of Total Parenteral Nutrition Solutions"; Thrasher Research Fund Award No. 02818-1, Six Month Research Progress Report; 2004, pp. 1-5.

Dr. Robert A. Yokel; "Reduction of Toxicity in the Premature Neonate Associated with Aluminum as a Contaminant of Total Parenteral Nutrition Solutions"; Thrasher Research Fund Award No. 02818-1, Twelve Month Research Progress Report (undated), pp. 1-5.

Dr. Robert A. Yokel; "Reduction of Toxicity in the Premature Neonate Associated with Aluminum as a Contaminant of Total Parenteral Nutrition Solutions"; Thrasher Research Fund Award No. 02818-1, Eighteen Month Research Progress Report (undated), pp. 1-4.

Dr. Robert A. Yokel; "Reduction of Toxicity in the Premature Neonate Associated with Aluminum as a Contaminant of Total Perenteral Nutrition Solutions"; Thrasher Research Project, Scientific Abstract; Award 02818-1, (undated); pp. 4-17.

Dr. Robert A. Yokel, et al.; "Reduction of Toxicity in the Premature Neonate Associated with Aluminum as a Contaminant of Total Parenteral Nutrition Solutions"; College of Pharmacy, University of Kentucky; Dept. of Chemistry & Biochemistry, University of Missouri (undated); 54 pages.

Dr. Robert A. Yokel, Semiannual Progress Report; Thrasher Research Fund Award No. 02818-1; "Reduction of Toxicity in the Premature Neonate Associated with Aluminum as a Contaminant of Total Perenteral Nutrition Solutions"; Feb. 14, 2006, Reporting Period Mar. 1, 2005 to Aug. 31, 2005; pp. 1-4.

Evers et al.; Similarities Between Al(3+) and Fe(3+), Inorg. Chem. 1989, 28:2189; (Feb. 14, 2006), pp. 1-40.

Hutchinson, et al.; "Solid phase extraction of metal ions using immobilised chelating calixarene tetrahydroxamates"; Analytica Chimica Acta 291 (1994) pp. 269-275; Elsevier Science B.V.

Liu, et al.; "Synthesis and Coordination Behaviour of Hydroxamate Resin with Varying Spacer Groups"; Polyhedron vol. 11, No. 5, pp. 551-558 (1992).

Lu, et al.; "Kinetic studies of aluminum and zinc speciation in river water and snow"; Analytica Chimica Acta 293 (1994) pp. 95-108; Elsevier Science B.V.

MBA Tech Connection, Intellectual Property Overview Report, Aluminum Chelator Concept, undated, pp. 1-26.

Philips et al.; "Extraction of Metal Ions by N-Phenyl-, N-Methyl-, and N-Unsubstituted Hydroxamic Acid Resins"; Analytica Chimica Acta, 139 (1982) pp. 237-249; Elsevier Scientific Publishing Company.

Vernon, F.; "Chelating Ion Exchangers—The Synthesis and Uses of Poly(hydroxamic Acid) Resins"; Pure & Appl. Chem., vol. 54, No. 11, pp. 2151-2158, 1982; Pergamon Press Ltd.

FLOW-THROUGH FILTER TO REMOVE ALUMINUM FROM MEDICAL SOLUTIONS

This utility patent application claims the benefit of priority in U.S. Provisional Patent Application Ser. No. 61/768,006 filed on Feb. 22, 2013 and is a continuation-in-part of U.S. patent application Ser. No. 13/278,498, filed on Oct. 21, 2011, now U.S. Pat. No. 9,139,456, which is a continuation-in-part of U.S. patent application Ser. No. 13/052,477, filed on Mar. 21, 2011 which is now issued U.S. Pat. No. 8,066,883 and is a divisional of U.S. patent application Ser. No. 12/104,066, filed on Apr. 16, 2008 which is now issued U.S. Pat. No. 7,932,326, the entirety of the disclosures of which are incorporated herein by reference.

TECHNICAL FIELD

This document relates generally to filter assemblies for removing metal ions from a solution and, more particularly, to a filter assembly capable of removing trivalent ions, such as aluminum, and tetravalent metal ions, from medical solutions.

BACKGROUND

Aluminum (Al) is a common contaminant in many medical solutions. This is in part the result of the widespread distribution of aluminum in the environment. In addition, some medical solutions contain compounds that react strongly with aluminum and extract this metal from the surroundings, e.g. from the walls of glass containers. This strong binding increases the Al contamination and makes it much more difficult to remove the aluminum from these solutions.

Healthy adults are generally protected against oral aluminum toxicity by the fact that less than 1% of an oral dose of aluminum is absorbed from the intestine. In addition, the urinary excretion of aluminum is relatively effective for persons with normal kidney function.

There is a special concern regarding aluminum exposure to premature neonates. These infants routinely require several or more days of parenteral nutrition (PN) until they can tolerate oral feeding. The PN bypasses the normal protection associated with low intestinal absorption of Al. In addition, these infants often have underdeveloped kidney function (the primary route of Al elimination), which impedes the excretion of the aluminum contained in the PN solution.

It is well known that some of the small volume parenteral (SVP) solutions used to prepare the final PN solutions are heavily contaminated with aluminum. Poole, co-workers and others have extensively documented the Al content of SVP solutions, as shown in Table 1.

TABLE 1

Aluminum content of the most contaminated SVP solutions
Solution Aluminum concentration (micrograms/L)

| | |
|---|---|
| Calcium gluconate and 19,400[3] | 3234 and 1920 to 3495[1], 4900 (new) and 6145 (old glass ampoules)[2], 9205 |
| Potassium phosphate | 8280 and 3650 to 16,820[1] |
| Sodium Phosphate | 622 and 17 to 3281[1] |
| Multi-trace elements | 414 and 101 to 739[1], 1049 and 2065[3] |
| Potassium Lactate | 1500[4] |

TABLE 1-continued

Aluminum content of the most contaminated SVP solutions
Solution Aluminum concentration (micrograms/L)

| | |
|---|---|
| Potassium Acetate | 42 and 11 to 1120[1] |
| Sodium acetate | 83 and 54 to 138[1] |

[1]From Poole et al., Pediatr. Gastroenterol. Nutr. 2010, 50: 208; Poole et al., J. Pediatr. Pharmacol. Ther. 2011, 16: 92.
[2]From Beaney and Smeaton, Congress of the European Association of Hospital Pharmacists, 2010.
[3]From de Oliveira et al., JPEN J Parenter Enteral Nutr 2010, 34: 322-328.
[4]From Advenier et al., J. Pediatr. Gastroenterol. Nutr. 2003, 36: 448.

Because of the relative volumes of each of these solutions included in a typical PN preparation, most of the final Al content originates from the calcium gluconate SVP solution. It is noteworthy that the Al content of calcium gluconate can vary widely, depending on the commercial provider. Reported Al concentrations range from 1920 to 19,400 micrograms/L. At a typical concentration of 4,000 micrograms/L, it is estimated that calcium gluconate contributes about 80% of the aluminum in the final PN solution (Mouser et al., Am. J. Health-Syst. Pharm., 1998, 55: 1071).

The FDA has formally recognized the problem of potential Al toxicity to premature infants. It has established a safe level of Al exposure as 4 to 5 micrograms/kg/d. However, it is widely recognized that currently the U.S. pharmaceutical industry cannot supply SVP component solutions that allow pediatric pharmacists to prepare PN solutions that meet this exposure limit.

Other patient populations at risk include, but are not limited to, children with malabsorption syndrome, dialysis patients, elderly patients (due to a weakened GI protective barrier and/or normal renal function deterioration) and burn patients (due to Al-contaminated albumin to maintain oncotic pressure). In addition, critically ill infants and children require parenteral calcium replacement because of hypocalcemia, especially after cardiac surgery. More specifically, the amount of calcium required, provided as calcium gluconate, would lead to exposure to much greater than 5 micrograms of aluminum per kg per day. Removal of aluminum from these parenteral infusions would minimize potential aluminum-induced toxicities.

Disclosed herein is a single-use filter to remove aluminum from a solution as it passes through the filter. The body of the filter is filled with a specialized chelator, such as trihydroxamate chelating resin, described in our previous U.S. Pat. Nos. 7,932,326 and 8,066,883 and U.S. patent application Ser. No. 13/278,498 the full disclosures of which are incorporated herein by reference. The other components of the filter are designed to produce a controlled fluid flow rate, using a partially evacuated vial and a flow restriction/flow controller tube that has an internal diameter and length, that when paired with the extent of vacuum in the partially evacuated vial, achieves a desired flow rate. The filter is designed to connect to the evacuated vial and the vial of the source SVP solution.

Chelating resins are not new. Chelex 100® is a polystyrene resin which has iminodiacetic acid functional groups covalently linked to the resin. It is relatively non-selective, and thus is widely used to bind a large number of metal ions. However, we have determined that this type of generic chelating resin is not effective for removing aluminum from solutions such as calcium gluconate.

The concept of a flow-through filter for removing contaminants from aqueous solutions is also widely used. There are many examples of point-of-use filters for home faucets to remove both metal ions and organic contaminants. These typically remove metal ions by simple cation exchange. Thus they are not designed to compete against strong Al-binding ligands in the solution. More specialized chelating resins have been used in filters in research labs, but they have not been applied to the removal of aluminum from SVP solutions.

Flow-through filters have been used in medical settings. The chelating agent desferrioxamine has been physically imbedded into a hollow-fiber filter for the extracorporeal removal of iron and aluminum from blood during hemodialysis. Desferrioxamine has also been covalently bound to silica for the extracorporeal removal of metal ions from blood. Neither of these filters has been suggested for use in a pharmaceutical setting for removing aluminum from SVP solutions.

SUMMARY

In accordance with the purposes noted above, a flow through filter assembly is provided for removing trivalent and tetravalent metal ions from a solution. In one embodiment, the flow through assembly includes a housing containing a hydroxamate chelating resin. The housing has an inlet and an outlet. A first vial connector is provided in fluid communication with the inlet. A second vial connector is provided in fluid communication with the outlet. Further the filter assembly includes a flow controller for limiting flow through the housing to a predetermined rate. In one useful embodiment that predetermined rate is less than 2.0 ml/min. In another useful embodiment the predetermined rate is less than 1.0 ml/min. In yet another useful embodiment that predetermined rate is about 1.0 ml/min.

In one useful embodiment the first container connector is a vented spike and a first set of connector clips. In another useful embodiment the second container connector is a non-vented spike and a second set of connector clips. The second vial has a negative interior pressure before the non-vented spike is inserted into the second vial.

In accordance with an additional aspect a system is provided for removing a trivalent or tetravalent metal ion from a solution. The system comprises a first vial including a solution from which the trivalent or tetravalent metal ion is to be removed and a second vial for receiving a treated solution. The second vial has a negative interior pressure. Further the system includes a filter assembly for capturing the trivalent or tetravalent metal ion. The filter assembly is connected between the first and second vials.

The filter assembly includes a first connector for the first vial and a second connector for the second vial. The first connector is a vented spike and a first clamp. The second connector is a non-vented spike and a second clamp.

In accordance with yet another aspect, a flow-through filter assembly for removing metal ions from a medical solution, including aluminum ions, comprised of a housing including a medical solution inlet, an aluminum metal ion capturing agent having an Al-binding constant of at least approximately $10^{20}$ held in the vessel and a treated medical solution outlet. The treated medical solution outlet is positioned relative to the medical solution inlet to allow flow of medical solution through the filter assembly without a mechanical pump. Further, the assembly includes a flow controller for maintaining a rate of flow of medical solution through the filter assembly that allows capture of aluminum metal ions by the capturing agent.

In the following description there are shown and described a number of different embodiments of a flow-through filter assembly and an associated system. It should be realized that the flow-through filter assembly and system are capable of still other different embodiments and their several details are capable of modification and various obvious aspects. Accordingly, the drawings and descriptions will be regarded as illustrative in nature and not as restrictive.

BRIEF DESCRIPTION OF THE DRAWINGS

The accompanying drawings incorporated herein and forming a part of the specification, illustrate several aspects of the filter assembly and system and together with the description serve to explain certain principles thereof. In the drawings.

Reference will now be made in detail to the present preferred embodiments of the flow-through filter assembly and system illustrated in the accompanying drawings.

DETAILED DESCRIPTION

Figure 1:
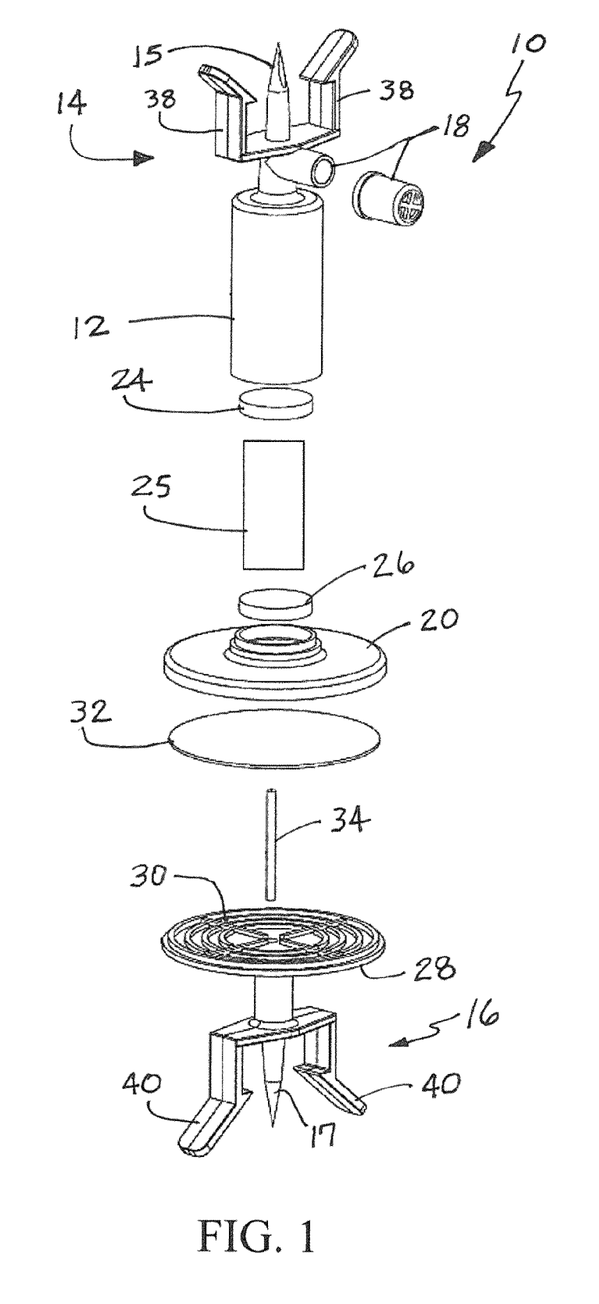
FIG. 1 is an exploded perspective view of the flow-through filter assembly.

Reference is now made to FIG. 1 generally illustrating the flow-through filter assembly 10 for removing trivalent and tetravalent metal ions from a solution. The flow-through assembly 10 includes a housing 12 containing a chelating agent or resin having an Al-binding constant of at least approximately $10^{20}$. In one useful embodiment that chelating agent is a trihydroxamate chelating resin. It should be appreciated, however, that other chelating agents/resins may be used including, but not limited to, desferrioxamine chelating resin, tetrahydroxamate chelating resin, hydroxypyridinone chelating resin, aminocarboxylate chelating resin, catechol chelating resin, poly-carboxylate chelating resin and mixtures thereof.

As further illustrated in FIG. 1, the flow-through filter assembly 10 includes a first container connector 14 at a first end and a second container connector 16 at a second end. In one possible embodiment the first container connector 14 is comprised of a vented spike 15 (note vent 18) and a first set of connector clips or clamp 38. In one possible embodiment the second container connector 16 comprises a non-vented spike 17 and a second set of connector clips or clamp 40.

The housing 12 contains the upper resin frit 24. The upper membrane housing 20 holds the lower resin frit 26. The resin is held between frits 24 and 26 during use of the filter assembly 10 (see also FIG. 3).

Figure 2:
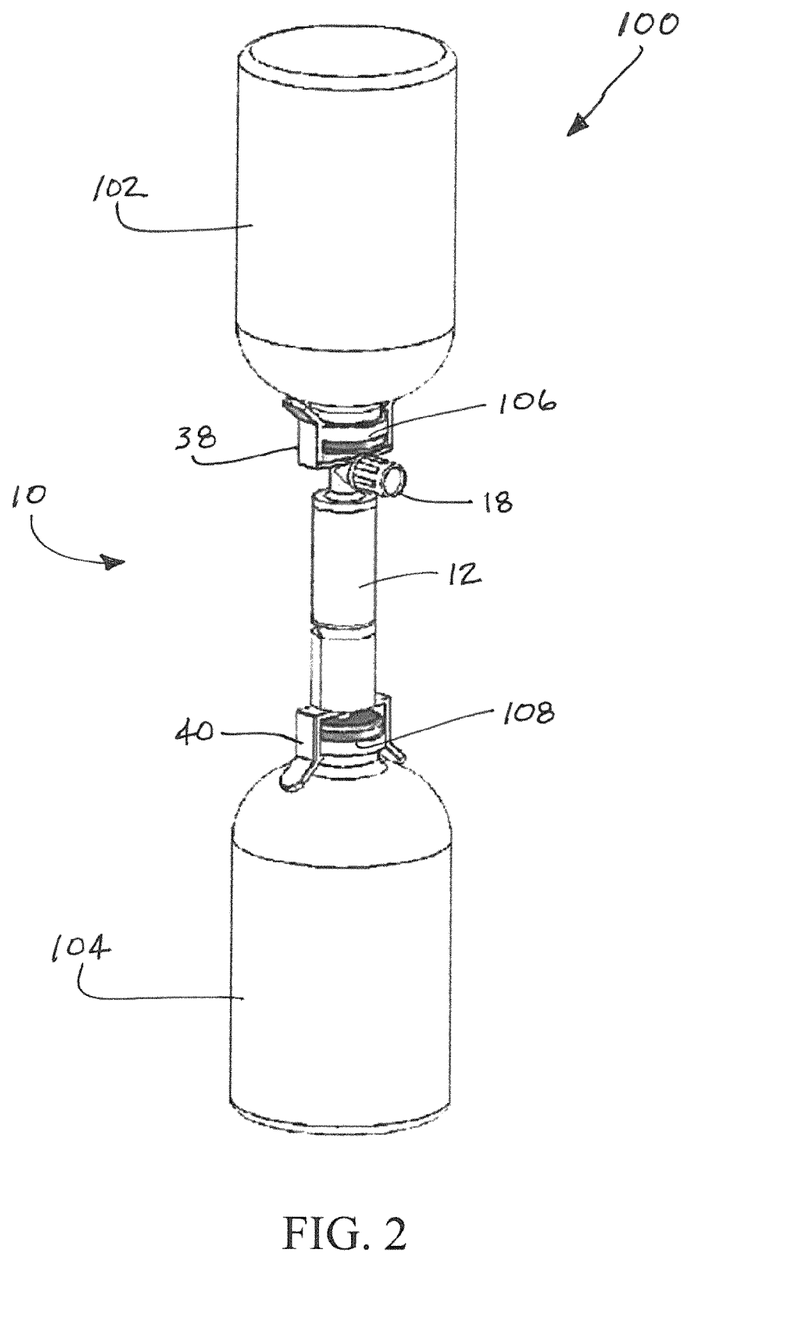
FIG. 2 is a perspective view of the system for removing a trivalent or tetravalent metal ion from a solution.

The filter assembly 10 also includes a lower membrane housing 28 including a grating 30 that supports a 0.2 or 0.45 micron filter membrane 32. That membrane 32 functions to make certain that no particulates from the chelating agent or resin in the housing 12 are carried into the treated solution that is collected in the second container 104 (FIG. 2). Such a filter membrane 32 may be built-in as an integral component of the filter assembly 10. Alternatively, a 0.2 or 0.45 micron filter cartridge may be inserted between the housing 12 and the lower, non-vented spike 17.

Figure 3:
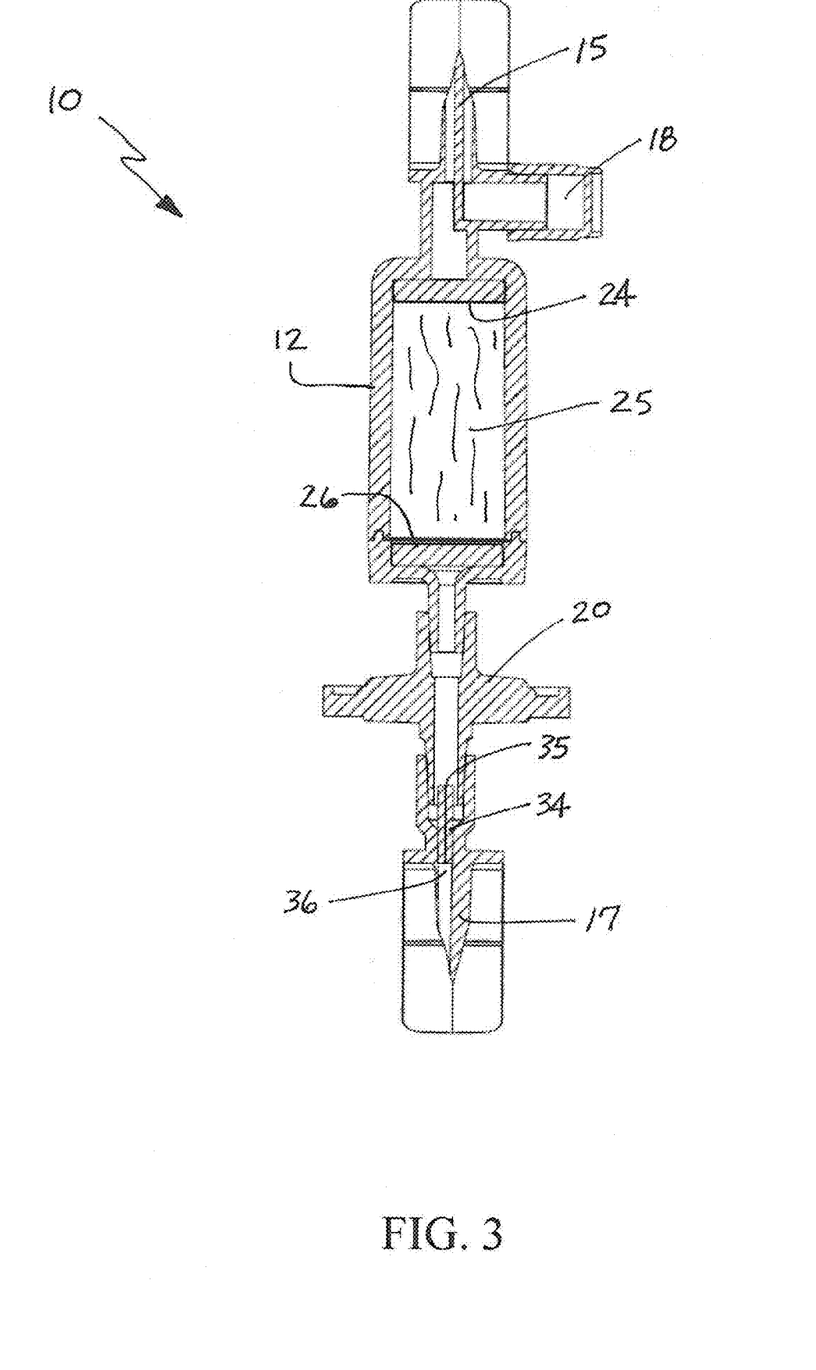
FIG. 3 is a detailed cross-sectional view illustrating the filter assembly.

As further illustrated in FIGS. 1 and 3, a flow controller 34 is provided within the control tube aperture 36 of the non-vented spike 17. This flow controller 34 functions to limit the flow of solution through the filter assembly 10 to a rate of between 0.1 and 10 ml/min. In another embodiment the flow controller 34 limits the rate of flow to less than 2.0 ml/min. In another embodiment the flow controller 34 limits the rate of flow to less than 1.0 ml/min. In yet another, the flow controller 34 limits the rate of flow to about 1.0 ml/min. In the illustrated embodiment, the flow controller 34 is a flow restrictor tube with an internal flow passage 35. It should be appreciated that the flow controller 34 does not have to be a tube, it can be molded directly into the spike 17, or a hole could be drilled in the spike to create a tube (passage) for fluid flow. The selected flow rate insures that there is sufficient time for trivalent and tetravalent metal ions in the solution to be captured by the chelating agent in the housing 12 as the solution flows through the housing 12.

As previously noted, it should be appreciated that the first container connector 14 includes the first set of clips 38 and the second container connector 16 includes the second set of clips 40. More specifically, the first set of clips 38 is engineered to snuggly clip onto the caps of a commercial container of SVP solution while the second set of clips 40 is engineered to snuggly clip onto an appropriately sized evacuated container so that the working system 100 (see FIG. 2) can be assembled conveniently and quickly and with no other clamping devices.

More specifically, with reference to FIG. 2, the system 100 includes: (a) a first vial or container 102 including a solution from which the trivalent or tetravalent ion is to be removed; (b) a second vial or container 104 for receiving a treated solution; and (c) the filter assembly 10 for capturing the trivalent or tetravalent metal ion. More specifically, as shown in FIG. 1 the clips 38 at the first end of the filter assembly 10 engage a cap 106 (FIG. 2) of the first container 102 effectively holding the vented spike 15, that is inserted into the vial through a puncturable seal in the cap, in fluid communication with the solution contained in the container. Similarly, the second set of clips 40 at the second end of the filter assembly 10 engage the cap 108 of the second container 104 effectively holding the non-vented spike 17, that is inserted into the vial through a puncturable seal in the cap, in fluid communication with the interior chamber of that container. The vent 18 to ambient atmosphere provided on the vented spike 15 works in conjunction with the negative pressure in the chamber of the second container 104 to produce a steady flow of solution from the first container 102 through the filter assembly 10 including the chelating agent or resin held in the housing 12 and the 0.2 or 0.45 micron membrane 32 to the chamber of the container 104. It should be appreciated that the chelating agent or resin in the housing 12 is specifically designed for high aluminum binding affinity enabling efficient extraction of aluminum even from solutions that contain high concentrations of competing aluminum complexing agents such as gluconate or phosphate.

More specifically, in one possible embodiment the trihydroxamate resin has an aluminum-binding constant of approximately $10^{20}$. This binding is strong enough to compete with the aluminum-binding ligands present in contaminated SVP solutions. However, the rate at which the aluminum binds to the resin is a critical factor. This rate can be slow, either because of the slow chemical exchange of aluminum between the solution and the immobilized chelating agent or because of the time required for the solution to pass through the porous structure of the resin beads. Thus, a key element in the design of the filter assembly is the ability to regulate the rate of flow of liquid through the filter assembly 10 to ensure sufficient contact time with the resin to produce effective aluminum removal. Toward this end, the filter assembly 10 includes the flow controller 34 built in the control tube aperture 36 of the lower spike (see FIG. 3). The inner diameter and length of the flow restriction/flow controller tube 34 is selected to produce the appropriate flow rate for efficient aluminum removal from the targeted medical solution, in concert with the level of reduced pressure in the second container, and other components of the filter 10. More specifically, a larger inner diameter flow restriction/flow controller tube 34 provides a faster flow rate. In contrast, a smaller inner diameter flow restriction/flow controller tube 34 provides a slower flow rate.

Still more specifically, the flow restrictor tube 34 of the illustrated embodiment includes the flow passage 35 which has a predetermined length L of between about 5 mm and about 20 mm and a predetermined diameter of between about 0.0508 mm and about 0.1778 mm. Further the second container 104 has a negative interior pressure P of between about 84,659.72 pascal and about 94,818.88 pascal. The difference in the ambient pressure provided in the first container 102 by the vent 18 on the spike 15 and the negative pressure in the second container 104 functions to pull the solution through the filter assembly 10, including the flow passage 35. Thus, it should be appreciated that the flow passage length L, the flow passage diameter D and the second container interior pressure P function together to provide the desired rate of flow of solution through the filter assembly 10.

Accordingly, the filter assembly 10 is engineered to provide the proper flow rate for removing the desired trivalent and/or tetravalent metal ions from the solution being treated. The operator does not need to adjust any pumps or monitor any equipment to provide the required flow rate. Thus, proper filtering of trivalent and tetravalent metal ions from the solution is ensured with minimal potential for any error.

The following examples are presented to further illustrate the flow-through filter 10 and system 100.

EXAMPLE

Removal of Al from Commercial Calcium Gluconate Solutions

We have prepared a filter assembly 10 specifically engineered for the removal of Al from calcium gluconate. The upper connector 14 is engineered to fit the neck of standard 10, 50 and 100 ml vials 102 of calcium gluconate.

The trihydroxamate chelating resin was initially tested in stirred, batch extractions to establish its ability to remove Al from calcium gluconate. A 1 g sample of resin was added to 100 ml of commercial calcium gluconate solution that was gently agitated by an overhead stirrer. In this configuration, the resin removed 80% of the Al. Based on the Al-binding constants of gluconate, the binding constant of the ligand immobilized on the resin was calculated to be $10^{20.4}$.

Figure 4:
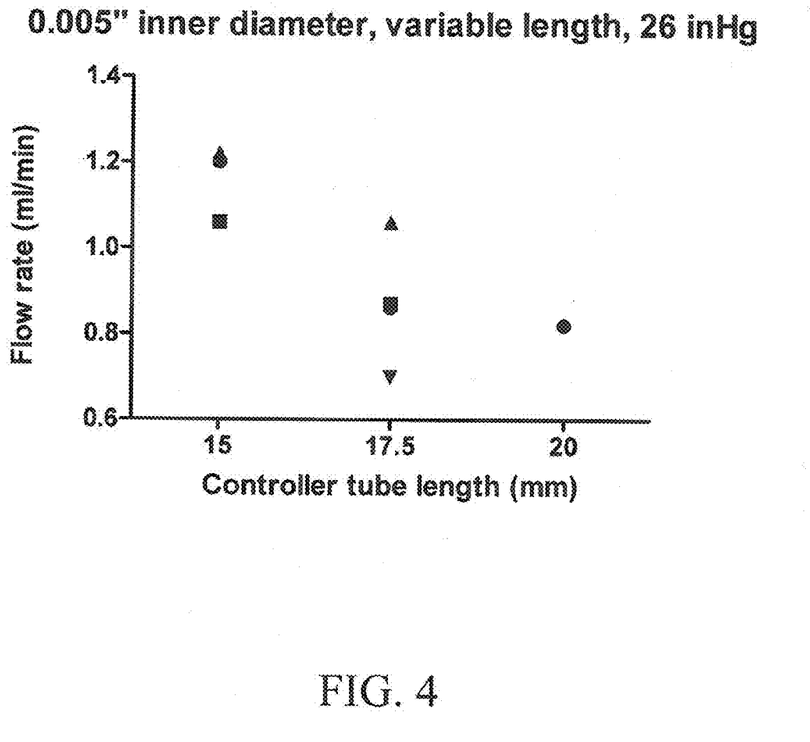
FIG. 4 is a graph of flow rate versus restrictor tube length for a flow restrictor tube of 0.005" (0.127 mm) diameter at a draw pressure of 88,046.11 pascal (26 inHg)

Approximately 1 g of ligand was loaded into a housing 12, and a calcium gluconate solution was pulled through the filter by an evacuated collection vial 104. The fraction of Al removed at various flow rates was measured. Aluminum removal is inversely related to flow rate. The flow can be changed by changing the inner diameter and length of the flow restriction/flow controller tube and the partial vacuum. Different applications may require a different flow rate. Thus the inner diameter of the flow restriction/flow controller tube 34 in the present embodiment has been adjusted to produce a flow of calcium gluconate of ~1 ml/min. For example, where the lower spike 17 has a flow restriction/flow controller tube 34 with an inner flow diameter of about 0.004 inches and a length of about 9/16 inches, the flow rate of calcium gluconate through the filter is about 1 ml/min. Flow rate will be a function of the inner diameter of the flow restriction/flow controller tube 34, the length of the flow restriction/flow controller tube 34, the level of vacuum in the second container 104, the viscosity of the fluid flowing through the filter assembly 10, and other properties of the filter. For example, for eight experiments, where the flow restriction/flow controller tube inner diameter was 0.004", its length 9 mm and the level of vacuum in the second container 104 was negative 27.1±0.1 inches of mercury in relation to atmospheric pressure, the flow rate of calcium gluconate averaged 0.93 ml/min. For six experiments, where the flow restriction/flow controller tube inner diameter was 0.004", its length 10 mm and the level of vacuum in the second container 104 was negative 27 inches of mercury in relation to atmospheric pressure, the average flow rate of calcium gluconate was 0.92 g/min. For twelve experiments, where the flow restriction/flow controller tube inner diameter was 0.004", its length 12 mm and the level of vacuum in the second container 104 was negative 27.5 inches of mercury, the average flow rate of calcium gluconate was 1.25 g/min. When nine experiments were conducted for which the inner diameter of the flow restriction/flow controller tube inner diameter was 0.005", its length was varied, and the level of vacuum in the second container 104 was 26 inches of mercury, calcium gluconate flow rate inversely related to the length of the flow restriction/flow controller tube (FIG. 4). These are examples of the method to control the flow rate using two dimensions of the flow restriction/flow controller tube 34 (internal diameter and length) with the level of vacuum in the second container 104. Other dimensions of these three variables can be used to achieve the same flow rate. Other properties of the filter, such as the membranes, also influence the flow rate.

The amount of resin loaded into the body of the cartridge was also varied. In four replicate experiments, 1 g of resin removed 91 to 95% of the aluminum from a commercial calcium gluconate solution that had an initial Al concentration of ~4,000 micrograms/L. Further tests showed that 800 mg of resin removed 79% of the Al, and 600 mg of resin removed only 64% of the Al. The column/cartridge 12 of the present filter assembly 10 has been engineered to hold 1 g of resin.

Since the Al concentration in commercial calcium gluconate solutions can vary, we also tested the present embodiment of the filter assembly 10 with calcium gluconate solutions that had been spiked with added Al to give total Al concentrations of 8,000 and 11,200 micrograms/L. The filter assembly 10 removed 94% and 90% of the aluminum, respectively, from these spiked solutions The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A flow-through filter assembly for removing trivalent and tetravalent metal ions from a solution, comprising:
   a housing containing a trihydroxamate chelating resin, said housing having an inlet and an outlet;
   a first container connector in fluid communication with said inlet;
   a second container connector in fluid communication with said outlet;
   a flow controller for limiting flow through said housing to a predetermined rate.

2. The filter of claim 1, wherein said predetermined rate is between 0.1 and 10 ml/min.

3. The filter of claim 1 wherein said predetermined rate is less than 2.0 ml/min.

4. The filter of claim 1, wherein said predetermined rate is less than 1.0 ml/min.

5. The filter of claim 1, wherein said predetermined rate is about 1.0 ml/min.

6. The filter of claim 1, wherein said first container connector includes a vented spike and a first set of connector clips.

7. The filter of claim 1, wherein said second container connector includes a non-vented spike and a second set of connector clips.

8. The filter of claim 1, wherein said second vial has a negative interior pressure.

9. The filter of claim 1, wherein said flow controller comprises a flow restrictor tube having a flow passage with a predetermined length L of between about 5 mm and about 20 mm and a predetermined inner diameter of between about 0.0508 mm and about 0.1778 mm.

10. A system for removing a trivalent or tetravalent metal ion from a solution, comprising:
    a first container including a solution from which said trivalent or tetravalent metal ion is to be removed;
    a second container for receiving a treated solution, said second vial having a negative interior pressure;
    a filter assembly for capturing and containing the trivalent or tetravalent metal ion, said filter assembly being connected between said first container and said second container.

11. The system of claim 10, wherein said filter assembly includes a first connector for said first container and a second connector for said second container.

12. The system of claim 11, wherein said first connector is a vented spike and a first clamp.

13. The system of claim 11, wherein said second connector is a non-vented spike and a second clamp.

14. The system of claim 11, wherein said first connector is a vented spike and a first clamp and said second connector is a non-vented spike and a second clamp.

15. The system of claim 10, wherein said filter assembly includes a flow controller comprising a flow restrictor tube having a flow passage with a predetermined length L of between about 5 mm and about 20 mm, a predetermined inner diameter D of between about 0.0508 mm and about 0.1778 mm and said second container has a negative interior pressure of between about 84,659.72 pascals and about 94,818.88 pascals, whereby said flow passage length L, said flow passage diameter D and said second container pressure P function together to provide a rate of flow of solution through said filter assembly of between about 0.1 ml/min and about 10.0 ml/min.

16. A flow-through filter assembly for removing aluminum metal ions from a medical solution including said aluminum metal ions comprising:
    a housing including a medical solution inlet;
    an aluminum metal ion capturing agent having an Al-binding constant of at least ~$10^{20}$ held in said housing;
    a treated medical solution outlet positioned on said housing relative to said medical solution inlet to allow for flow of medical solution through said filter assembly without a mechanical pump; and
    a flow controller for maintaining a rate of flow of medical solution through said filter assembly that allows capture of aluminum metal ions by said capturing agent.

17. The filter assembly of claim 16, wherein said rate of flow is less than 2.0 ml/min.

18. The filter assembly of claim 16, wherein said rate of flow is between about 0.1 ml/min and about 10.0 ml/min.

19. The filter assembly of claim 16, wherein said resin is a trihydroxamate chelating resin.

20. The filter assembly of claim 16, wherein said aluminum metal ion capturing agent is selected from a group consisting of trihydroxamate chelating resin, desferrioxamine chelating resin, tetrahydroxamate chelating resin, hydroxypyridinone chelating resin, aminocarboxylate chelating resin, tricatechol chelating resin, poly-carboxylate chelating resin and mixtures thereof.

\* \* \* \* \*